(12) United States Patent
Pentland

(10) Patent No.: US 6,655,074 B2
(45) Date of Patent: Dec. 2, 2003

(54) FLASHER

(76) Inventor: George G. Pentland, 7141 86th SE., Mercer Island, WA (US) 98040

( * ) Notice: Subject to any disclaimer, the term of this patent is extended or adjusted under 35 U.S.C. 154(b) by 12 days.

(21) Appl. No.: 09/995,896

(22) Filed: Nov. 28, 2001

(65) Prior Publication Data

US 2003/0097780 A1 May 29, 2003

(51) Int. Cl.$^7$ .............................................. A01K 85/14
(52) U.S. Cl. ...................... 43/43.13; 43/42.5; 43/43.12
(58) Field of Search ................................. 43/42.5, 53.5, 43/24, 25, 4, 5, 17.2, 43.13, 44.91, 42.36, 43.12; D22/134, 149; D8/33, 38

(56) References Cited

U.S. PATENT DOCUMENTS

| | | | | |
|---|---|---|---|---|
| 3,378,946 A | * | 4/1968 | Jay | 43/42.06 |
| 3,568,351 A | * | 3/1971 | Perrin | 43/17.1 |
| 3,881,271 A | * | 5/1975 | Jacura | 43/42.5 |
| 4,122,624 A | * | 10/1978 | Smith | 43/42.33 |
| 4,134,224 A | * | 1/1979 | Clark | 43/42.05 |
| 4,507,892 A | * | 4/1985 | Ochs | 43/42.18 |
| 5,113,608 A | * | 5/1992 | Hook | 43/42.36 |
| 6,279,260 B1 | | 8/2001 | Farr et al. | |
| 6,301,923 B1 | * | 10/2001 | Bonaquist et al. | 62/402 |
| D451,574 S | * | 12/2001 | Hobson et al. | D22/129 |
| D453,368 S | * | 2/2002 | Antonelli | D22/134 |

FOREIGN PATENT DOCUMENTS

FR 2602645 A1 * 2/1988 .......... A01K/85/14

* cited by examiner

*Primary Examiner*—Kurt Rowan
(74) *Attorney, Agent, or Firm*—Christenson O'Connor; Johnson Kindness PLLC

(57) ABSTRACT

A releasable fishing device includes a flasher body having a distal end and a proximal end. A guide member is attached to the proximal end of the flasher while a releasable member is releasably attached to the distal end of the flasher. A line is threaded through the guide member and an aperture in the releasable member. A stop is affixed to the line between the guide member and the releasable member. As the line is pulled through the water or trolled by movement of the rod relative to the water, the stop member contacts the guide member and pulls the body through the water so that it can function in a conventional manner. A lure is connected to the distal end of the line. Once a fish strikes the lure and runs with the bait, the line is drawn in a distal direction relative to the flasher. The stop member contacts the releasable member and releases that member from the flasher, thus allowing the line to move relatively freely as the fish runs with the lure.

1 Claim, 4 Drawing Sheets

FLASHER

FIELD OF THE INVENTION

The present invention relates to a fishing device, more particularly to a device for attracting fish to a lure and most particularly to a flasher that is releasably attached to a fishing line between the lure and a fishing rod.

BACKGROUND OF THE INVENTION

Fishing attractors and in particular conventional flashers have been used to attract fish such as salmon to a lure. Hereinafter, when the term lure is used, it is intended to encompass not only artificial lures, but also normal bait and/or other materials normally associated with a fish hook to cause a fish to strike and become hooked. The flasher is conventionally attached to a fishing line between the fisherman's rod and the lure. The function of the flasher is to cause lateral movement of the bait as the flasher and bait are drawn through the water. The flasher many times also has a shiny surface to visually attract the fish. When a fish strikes the lure, the flasher constitutes a significant drag not only as the fish runs with the lure but also as the fisherman is reeling in the fish. It is therefore desirable to have a flasher or similar fish attractor that functions in a conventional manner to attract fish, but does not create significant drag on the fishing line either in an outgoing or incoming mode once a fish has struck the lure.

SUMMARY OF THE INVENTION

The present invention in its broadest sense comprises a releasable fishing device. The device includes a body having a distal end and a proximal end. The body is preferably a fish attractor such as a flasher-type device. A guide member is attached to the proximal end of the body while a releasable member is releasably attached to the distal end of the body. The releasable member has an aperture therethrough. A line is threaded through the guide member and the aperture in the releasable member. A stop is affixed to the line between the guide member and the releasable member. As the body is pulled through the water or trolled by movement of the rod relative to the water, the stop member contacts the guide member and pulls the body through the water so that it can function in a conventional manner. A lure is connected to the distal end of the line. Once a fish strikes the lure and runs with the lure, the line is drawn in a distal direction relative to the body. As this occurs, the stop member translates in a distal direction and contacts the releasable member and releases the member from the body, thus allowing the line to move freely relative to the body as the fish runs with the lure.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is an enlarged cross-sectional view of the releasable member attached to the distal end of the attractor body;

DETAILED DESCRIPTION OF THE PREFERRED EMBODIMENT

Figure 1:
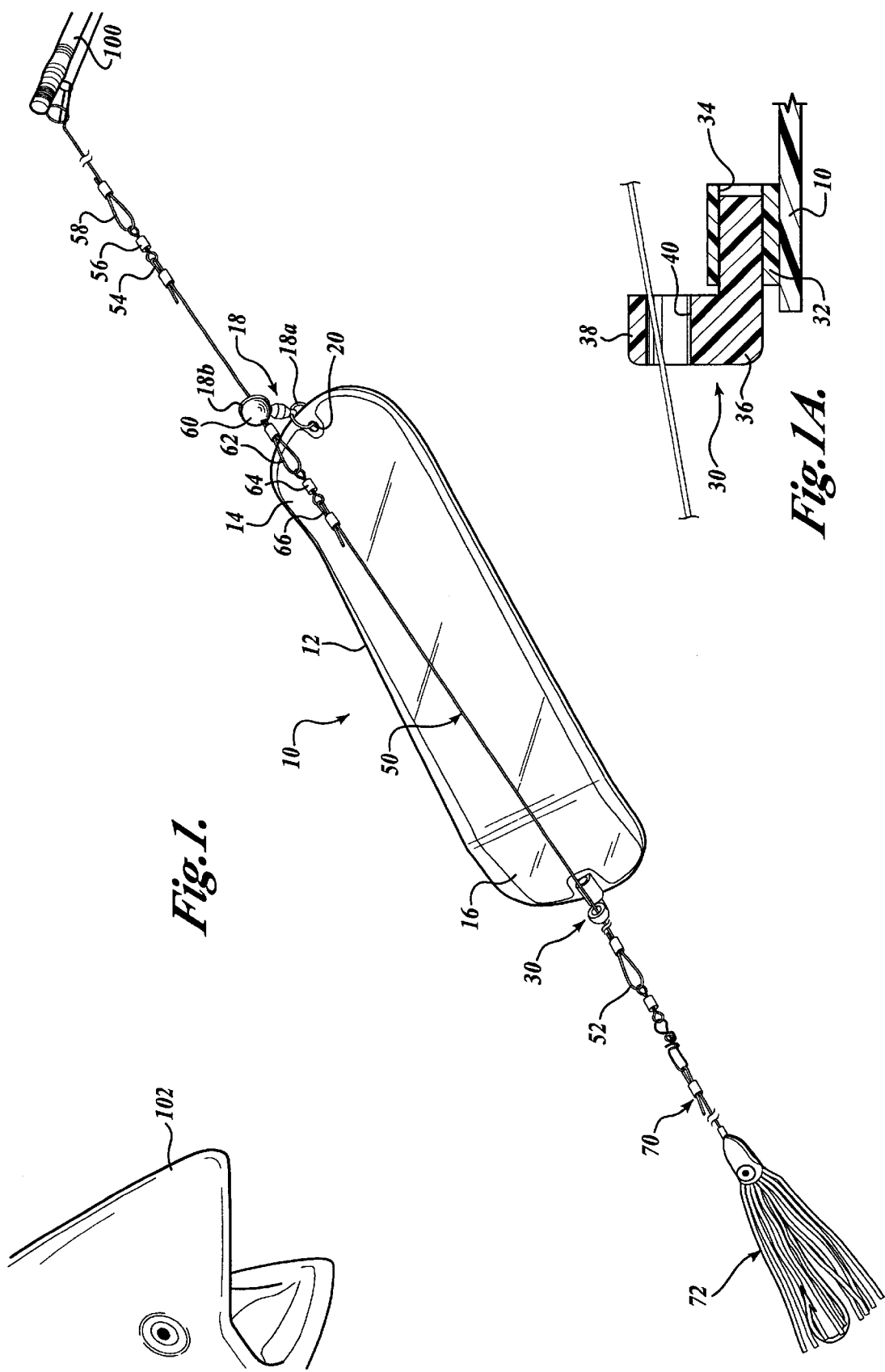
FIG. 1 is an isometric view of the fish attractor device of the present invention shown coupled to a rod and to a conventional lure.

Referring first to FIG. 1, the fish attractor device 10 in its preferred embodiment comprises a flasher body 12 having a proximal portion 14 and a distal portion 16. In its most preferred embodiment, the flasher 12 has an elongated central section, a distal portion 16 that is oriented at an acute angle to the central section, and a proximal portion 14 that is oriented at an acute angle in the opposite direction from the central portion. A guide member 18 is attached to the proximal portion 14. The guide member 18 preferably comprises a swivel having a ring 18a and 18b at each end. The first ring 18a is threaded through an aperture 20 in the proximal end of the flasher 12, thereby attaching the guide member 18 to the flasher.

Referring to FIGS. 1 and 1A, a release member generally designated 30 is affixed to the distal portion 16 of the flasher 12. The releasable member comprises a release pin 36 and a pin housing 32 that is preferably integrally affixed to the distal portion 16 of the flasher 12. The pin housing 32 carries a central bore 34 that is oriented generally in a longitudinal direction relative to the flasher body. The release pin 36 has a diameter that is slightly less than the diameter of the bore 34 so that it slidably and releasably engages the bore 34. A guide 38 is connected to the distal end of the pin 36, and is preferably offset therefrom. The guide 38 carries an aperture 40 that is oriented generally parallel to the axis of the pin. When pressure is exerted in a distal direction on the guide 38, the pin slidably releases from the bore 34 in a distal direction.

In its working embodiment, a release line generally designated 50 is threaded through the aperture 40 of the release mechanism 30 and terminates at its distal end in a secure loop 52, positioned distally of the release mechanism 30. Similarly, the proximal end of the line 50 is threaded through the free ring 18b of the guide member 18 and terminates proximally of the guide member in a secure loop 54. A swivel 56 is employed to couple the line 50 to a loop 58 on the distal end of the fishing line extending from the fishing rod 100. A stop member 60 is positioned between the guide member 18 and the release mechanism 30. The stop member 60 is preferably slidably mounted on the line 50, and is slidable between a first intermediate fixed loop 62 distal to the stop member 60 and the loop 54. Loop 62 is coupled by another swivel 64 to a second intermediate loop 66 forming part of line 50 that is located between the swivel 64 and the release mechanism 30. Line 50 continues from loop 66 distally to terminate in the distal loop 52.

In normal operation as shown in FIG. 1, as the rod 100 and its associated fishing line is moved above the water relative to the water surface, the stop member contacts ring 18b and runs against loop 62, in essence fixing the stop member relative to lure 50. As this occurs, the flasher 12 is drawn through the water at the same speed as the fishing line. The flasher moves to and fro in a conventional manner pulled by the stop member 60 engaging the guide member 18. Loop 52 at the distal end of the release line 50 is coupled by conventional swivel and tackle assembly 70 to a lure.

Figure 2:
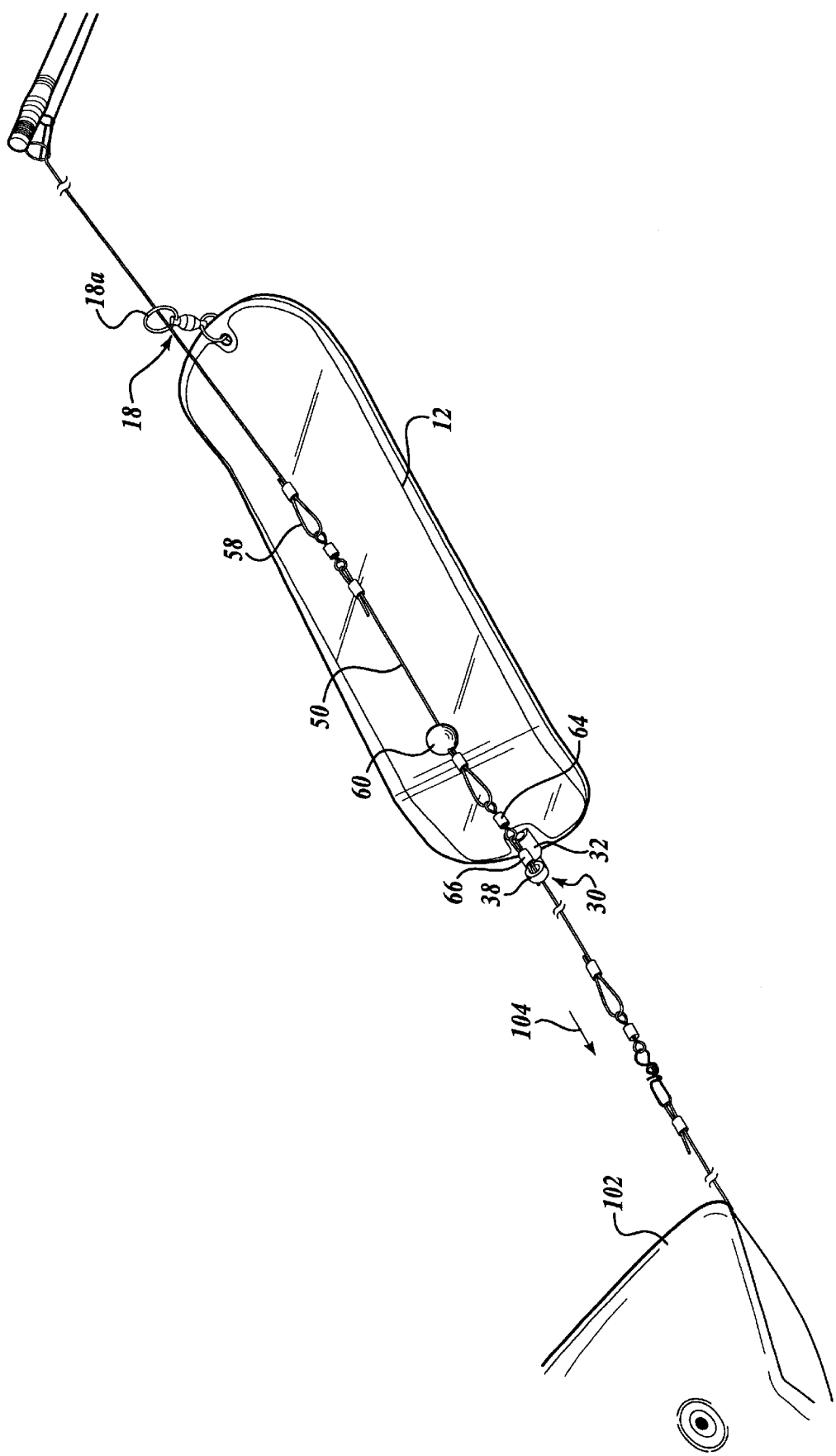
FIG. 2 is a view similar to FIG. 1 showing the movement of the line relative to the attractor body once a fish has struck the lure.
Figure 3:
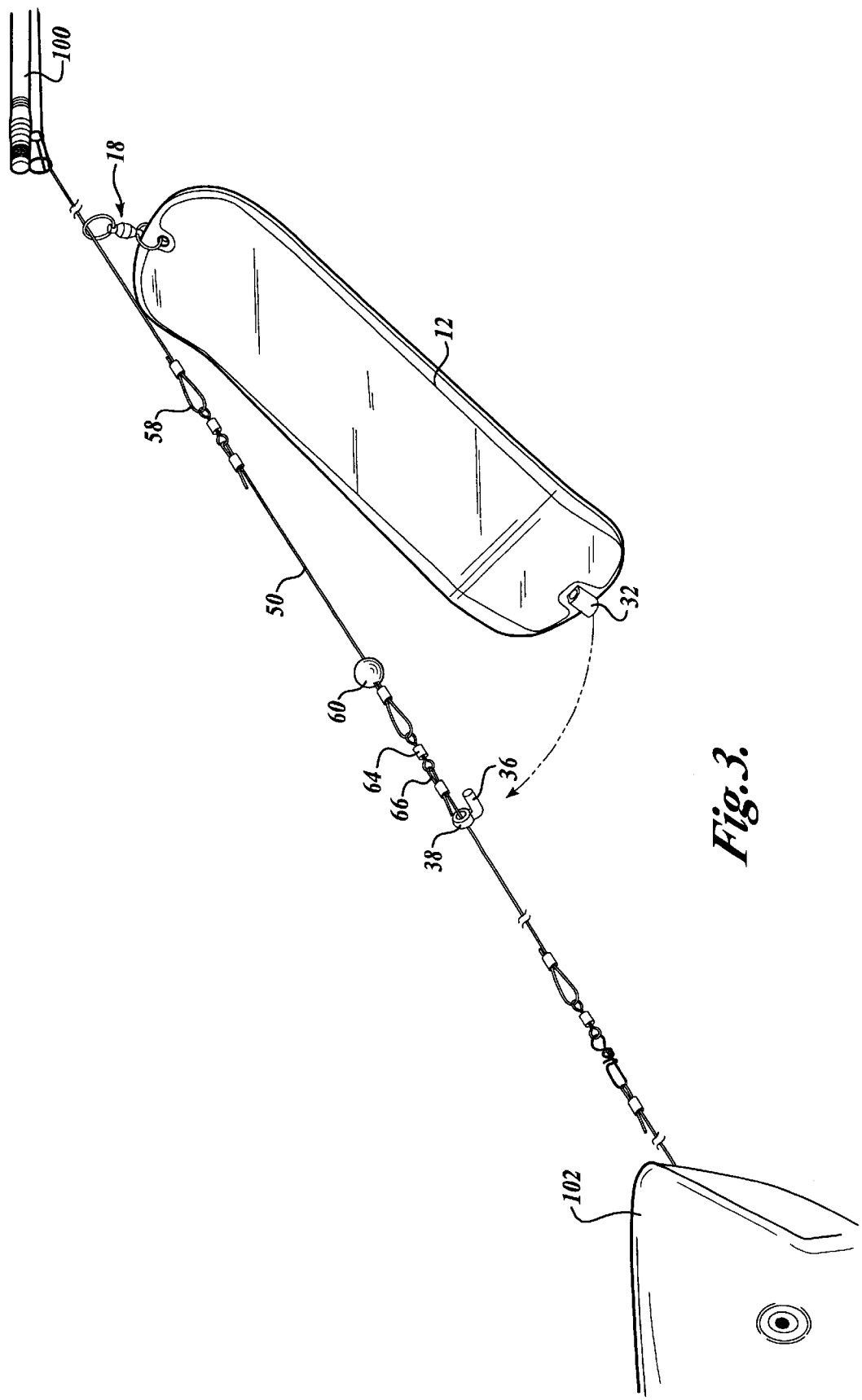
FIG. 3 illustrates the releasable member releasing from the attractor body.

As shown in FIG. 2, when the fish 102 strikes the lure, the release line 50 is pulled by the running fish in a distal direction, that is, in the direction of arrow 104. The line 50 thus moves relative to the flasher 12 until the loop 66, contacts the guide 38 of the release member 30. It is of course to be understood that if loops 66 or 62 and swivel 64 were sized sufficiently small to slip through the aperture 40 (FIG. 1A), the stop member is sized larger than the aperture 40 so that it will contact the guide 38. If this occurs, the line 50 will move in a distal direction until loop 54 engages the stop member 60. As the fish continues to run, the distal movement of the release line 50 causes one or more of these members to bear in a distal direction on the guide 38 and thus the pin 36 to pull the pin 36 from the pin housing 32 as shown in FIG. 3. As this occurs, the flasher 12 is allowed to run freely along the fishing line leading to the rod 100. Thus, the fish can run away from the rod, pulling line from the rod without causing drag on the fish itself. The only drag thus exerted on the fish is that imposed by the fisherman in the operation of his fishing reel.

Figure 4:
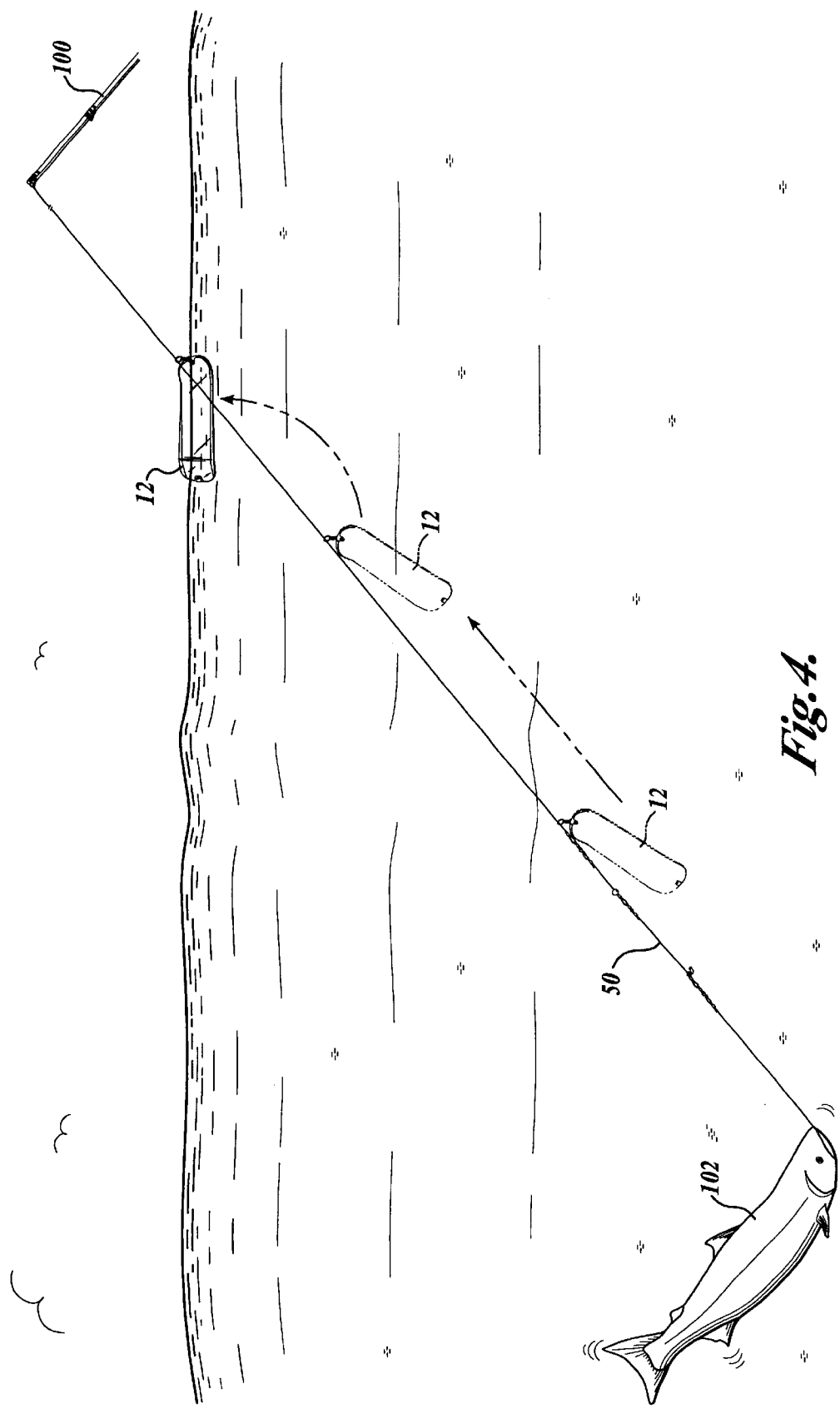
FIG. 4 shows the attractor body rising to the surface under its own buoyancy along the fishing line as the fisherman fights the fish.

As shown in FIG. 4, the flasher 12 preferably has a buoyant body that then rises to the surface still attached to the fishing line by the guide member 18. Thus, the fish 102 can be brought from the depths to the surface and netted with little or no additional drag caused by the flasher 12. The flasher of course remains slidably attached to the fishing line so that it can be retrieved along with the fish when the fish is netted.

While the preferred embodiment of the invention has been illustrated and described, it will be appreciated that various changes can be made therein without departing from the spirit and scope of the invention. For example, the release line 50 can be continuous between the terminal loops 52 and 54, and the stop member 60 can be affixed to the line 50 so that it cannot slide. This alternate will function equivalently to the embodiment disclosed. In addition, a variety of release mechanisms known in the art can be substituted for that shown without significantly detracting from its performance.

The embodiments of the invention in which an exclusive property or privilege is claimed are defined as follows:

1. A releasable fishing device comprising:

a body having a distal end and a proximal end;

a first guide member attached to the proximal end of the body;

a releasable member releasably attached to the distal end of the body, said releasable member including a pin having an axis, and a guide affixed to said pin, said guide having said aperture therethrough, said aperture having an axis, said axis of said aperture being laterally offset from and parallel to the axis of said pin;

a pin housing attached to the distal end of said body, said pin housing having a bore therein for releasably receiving said pin such that said pin can slidably exit from said bore in a distal direction;

a line threaded through said first guide member and said aperture;

and a stop member affixed to said line between said guide member and said releasable member, said stop engaging said guide member when said line is drawn in a proximal direction to pull said body in a proximal direction, said stop translating to engage said releasable member when said line is translated in a distal direction relative to said body so as to engage said releasable member and release said releasable member from said body as said stop member translates in a distal direction.

* * * * *